United States Patent

Matsuoka

(10) Patent No.: US 6,263,120 B1
(45) Date of Patent: Jul. 17, 2001

(54) IMAGE DATA INTERPOLATION PROCESSING METHOD

(75) Inventor: Teruhiko Matsuoka, Sakura (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/161,482

(22) Filed: Sep. 28, 1998

(30) Foreign Application Priority Data

Nov. 11, 1997 (JP) .................................................... 9-308722

(51) Int. Cl.⁷ ...................................................... G06K 9/32
(52) U.S. Cl. ................................................................ 382/300
(58) Field of Search .................................... 382/300, 250, 382/262, 263, 264, 299

(56) References Cited

U.S. PATENT DOCUMENTS

| 5,008,752 | * | 4/1991 | Van Nostrand | 358/160 |
| 5,054,100 | * | 10/1991 | Tai | 382/47 |
| 5,301,266 | * | 4/1994 | Kimura | 395/139 |
| 5,754,710 | * | 5/1998 | Sekine et al. | 382/300 |
| 5,832,120 | * | 11/1998 | Prabhakar et al. | 382/233 |
| 5,870,105 | * | 2/1999 | Jensen | 345/441 |
| 5,889,894 | * | 3/1999 | Ito et al. | 382/300 |
| 5,953,465 | * | 9/1999 | Saotome | 382/300 |
| 5,991,464 | * | 11/1999 | Hsu et al. | 382/300 |

FOREIGN PATENT DOCUMENTS 5-135165    6/1993   (JP) .

* cited by examiner

*Primary Examiner*—Yon J. Couso
(74) *Attorney, Agent, or Firm*—Nixon & Vanderhye P.C.

(57) ABSTRACT

An original image containing different kinds of components-areas is adaptively processed by applying interpolating methods suitably selected for respective areas. The processing method comprises the steps of extracting data of a partial image from data of a multi-gradation original image (STEP 1), converting the partial image data into frequency data by using a frequency transformation matrix (e.g., the same size DCT) and storing the transformed data as coefficients of the matrix (STEP 2), calculating a mean of absolute values of the coefficients for each frequency domain (STEP 3), discriminating whether the partial image contains an edge portion by applying the mean coefficient value to conditional equations (STEP 4), selecting a filter for surface interpolation or linear interpolation on the basis of the discrimination result (STEP 5) and interpolating the data of the partial image (STEP 6).

5 Claims, 10 Drawing Sheets

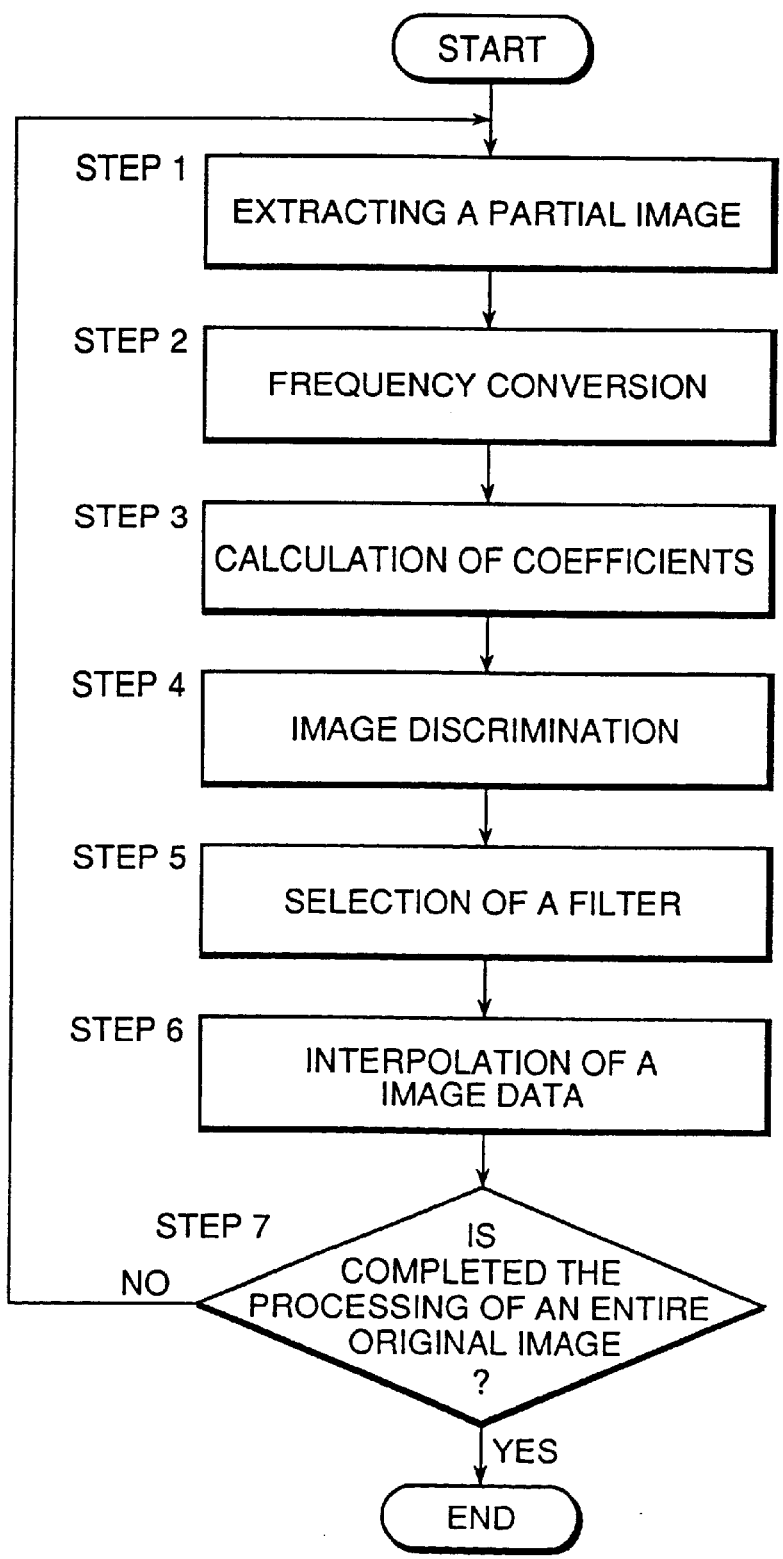

FIG.2A

| 239 | 255 | 249 | 232 |
|-----|-----|-----|-----|
| 246 | 255 | 244 | 214 |
| 255 | 255 | 235 | 201 |
| 255 | 246 | 219 | 183 |

FIG.2B

| 255 | 255 | 255 | 55  |
|-----|-----|-----|-----|
| 136 | 255 | 255 | 255 |
| 4   | 122 | 255 | 255 |
| 2   | 1   | 118 | 255 |

FIG.3

| 4096 | 4096  | 4096  | 4096  |
|------|-------|-------|-------|
| 5352 | 2217  | -2217 | -5352 |
| 4096 | -4096 | -4096 | 4096  |
| 2217 | -5352 | 5352  | -2217 |

| 434 | 63  | -33 | 2  |
|-----|-----|-----|----|
| 25  | -36 | -3  | -3 |
| -7  | -2  | 3   | -1 |
| 5   | -2  | 1   | -1 | f1=41    f2=9    f3=2

| 221 | -237 | -25 | -2  |
|-----|------|-----|-----|
| 246 | 162  | -45 | -19 |
| -35 | 40   | 94  | 11  |
| 1   | -27  | -18 | 31  | f1=215    f2=47    f3=15

X(0,0) : DC COMPONENT

F1, F2, F3

FIG.6A
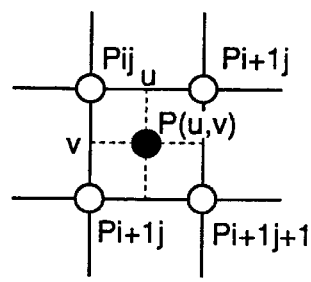
FIG.6B
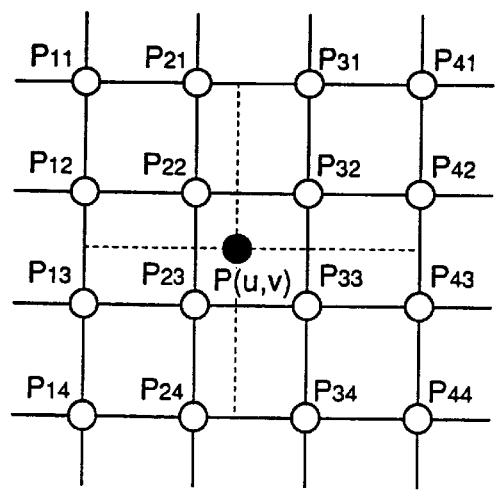
FIG.7A
| 239 | 247 | 255 | 252 | 249 | 241 | 232 |  |
|-----|-----|-----|-----|-----|-----|-----|--|
| 243 | 249 | 255 | 251 | 247 | 235 | 223 |  |
| 246 | 251 | 255 | 250 | 244 | 229 | 214 |  |
| 251 | 253 | 255 | 248 | 240 | 224 | 208 |  |
| 255 | 255 | 255 | 245 | 235 | 218 | 201 |  |
| 255 | 253 | 251 | 239 | 227 | 210 | 192 |  |
| 255 | 251 | 246 | 233 | 219 | 201 | 183 |  |
|     |     |     |     |     |     |     |  |
FIG.7B
| 255 | 255 | 255 | 255 | 255 | 255 | 255 |  |
|-----|-----|-----|-----|-----|-----|-----|--|
| 212 | 243 | 255 | 255 | 255 | 252 | 255 |  |
| 136 | 195 | 255 | 255 | 255 | 255 | 255 |  |
| 55  | 120 | 203 | 255 | 255 | 255 | 255 |  |
| 4   | 46  | 122 | 203 | 255 | 255 | 255 |  |
| 0   | 0   | 44  | 114 | 186 | 238 | 255 |  |
| 2   | 0   | 1   | 42  | 118 | 201 | 255 |  |
|     |     |     |     |     |     |     |  |

IMAGE DATA INTERPOLATION PROCESSING METHOD

BACKGROUND OF THE INVENTION

The present invention relates to an image-data interpolation processing method for interpolation of insufficient image data to achieve high-resolution transformation and magnification of a multigradational image containing different kinds of components coexisting in the image.

A typical image-processing device for processing an image data inputted from a scanner or the like input device usually conducts interpolation of insufficient image data to convert a low-resolution multigradational image into a high-resolution and/or an enlarged small-sized multigradational image. There are several known methods for interpolating image data. Examples are nearest neighbor interpolation that directly applies data of the nearest neighbor to a pixel to be interpolated, bilinear interpolation that calculates a planar product-sum from surrounding pixels and cubic convolution interpolation that calculates a curved-surface product-sum according to the surrounding pixels.

These interpolation processing methods have both merits and demerits. The nearest neighbor interpolation has the shortest processing time but produces jaggies of an oblique line, resulting in deterioration of the image. The bilinear interpolation has a relatively short processing time and suitable to interpolate a portion having a smooth change in density, but it causes unclearness of a portion sharply changing in density such as an edge of the image. The cubic convolution interpolation can smoothly interpolate a portion having a moderate change in density with a small deterioration of the image quality and clearly reproduce an edge portion but it requires a long time of processing and emphasizes a noise existing in a smooth density-varying portion, resulting in the deterioration of the image quality.

Consequently, an image that includes a character (edge-like) image area and photographic (non-edge) image area cannot sufficiently be processed by applying merely one of the above methods of interpolation. In other words, any of the above interpolation methods cannot convert and/or enlarge the image in such a way that it may realize at the same time the high-resolution of the character-image area and the smoothly varying density of the photographic image area.

Accordingly, an attempt has been made to provide an image processing device that strictly distinguishes an edge-component area from an edgeless area and processes these different areas by different methods of interpolation. For example, Japanese Laid-Open Patent Publication No. 5-135165 discloses such an arrangement that determines the maximum value and the minimum value of densities in a local area including attentional pixel and surrounding pixels, discriminates, based on the maximal density value obtained by subtracting the least value from the largest value, whether the attentional pixel belongs to the character (edge) area or the (non-edge) face-area, and executes processing adapted to the character image area or the photographic image area.

However, the image processing device disclosed in Japanese Laid-Open Patent Publication No. 5-135165, which extracts an edge image area according to a change in density of pixels including an attentional pixel, involves following problems:

The device may obtain an erroneous large differential density value from a partial image area containing a noise irrespective of the area having a moderate variation of densities of pixels including an attentional pixel.

Furthermore, the rotation of a whole image may cause a change in a density pattern of the partial image area due to the changed direction of the edge image. In other words, the same partial image area extracted in different directions may have two different discrimination results. To avoid this, different extracting conditions must be provided for the image before and after rotated, whereby the discrimination processing may be complicated.

In addition, image areas must be separated before interpolation, whereby the processing not only takes longer time but also complicates the circuitry of the device which, therefore, has an enlarged size and is expensive to manufacture.

SUMMARY OF THE INVENTION

An object of the present invention is to provide an image-data interpolation processing method that can easily process an image including different kinds of image areas (e.g., a character image area and a photographic-image area) through performing adaptive interpolation to create the high-resolution character image-area and the smooth gradational photographic image area with no need of separation of areas before interpolation, thus enabling an image processing device to be compact in size with simplified circuitry and manufactured at a reduced cost.

Another object of the present invention is to provide an image-data interpolation processing method that can extract a partial image area from an original image, divide a frequency-conversion coefficient matrix, for converting image data composing the partial image extracted from an original image into frequency data, into a matrix of plural frequency domains, discriminate whether the partial image contains an edge-portion according to a mean value obtained for each frequency domain and select a suitable interpolating method in such away the partial image including an edge portion is processed by cubic convolution interpolation for maintaining the edge-portion feature and the partial image not including an edge-portion is processed by bilinear interpolation for maintaining the smooth change in density.

Another object of the present invention is to provide an image-data interpolation processing method that can extract a partial image area from an original image, convert image data composing the partial image extracted from an original image into frequency data by discrete cosine transformation processing, divide discrete-cosine transformation coefficients into plural frequency domains according to coordinates in a matrix, discriminate whether the area contains an edge-portion according to a mean value obtained for the domain and select a suitable interpolating method, whereby the discrete cosine transformation of image data can be easily done and the discrimination of edge-portion can be done without consideration of direction of the edge portion.

Another object of the present invention is to provide an image-data interpolation processing method that can calculate mean values of frequency conversion coefficients for each of the frequency domains by using absolute values of the coefficients, whereby a sum of the frequency conversion coefficients for respective frequency domains can be calculated without canceling the features of respective pixels, thus allowing the interpolated image to maintain the features of the original.

Another object of the present invention is to provide an image-data interpolation processing method that can execute adaptive processing of partial images of an original image depending on the presence or absence of an edge-like component therein in such a manner that a partial image containing an edge component is processed by cubic convolution interpolation for maintaining the edge image feature or a partial image with no edge-like component is processed by bilinear interpolation for maintaining smooth change in density of pixels therein.

Another object of the present invention is to provide an image-data interpolation processing method that can determine the density of an interpolating pixel by using a monotone increasing function allowing replacing a gradient and an input value depending on a difference between densities of two neighbors existing one at each side of the interpolating pixel in each partial image, whereby any partial image can be adaptively processed with ease for a shorter time, eliminating the need of discriminating whether the image contains an edge-like component or not.

Another object of the present invention is to provide an image-data interpolation processing method that can interpolate an image data by presetting an interpolating pixel value at a half of a differential density value determined between two neighbors existing one at each side of the interpolating pixel when the difference is relatively small or by presetting an interpolating pixel value at a smaller one of the neighbors when the difference is relatively large, whereby a partial image with no edge-like component (with a small differential density) can be processed similarly as processed by the bilinear interpolation for maintaining the smooth change in density of the image or a partial image containing edge-like component (with a large differential density) can be interpolated similarly as processed by the interpolation for maintaining the feature of the edge image.

BRIEF DESCRIPTION OF THE DRAWINGS

FIG. 1 is a flow chart depicting the procedure of interpolating image data by an image-data interpolation processing method according to the first embodiment of the present invention.

FIGS. 2A and 2B are illustrative of partial image data extracted from an original image, which are subjected to interpolation by the method of FIG. 1.

FIG. 3 shows computed values for use in a high-speed operational algorithm for frequency conversion according to the method of FIG. 1.

FIGS. 6A and 6B are illustrative of bilinear interpolation and cubic-convolution interpolation of image data according to the method of FIG. 1.

FIGS. 7A and 7B are illustrative of partial image data after interpolation according to the method of FIG. 1.

PREFERRED EMBODIMENT OF THE INVENTION

Figures 4A, 4B, 5:
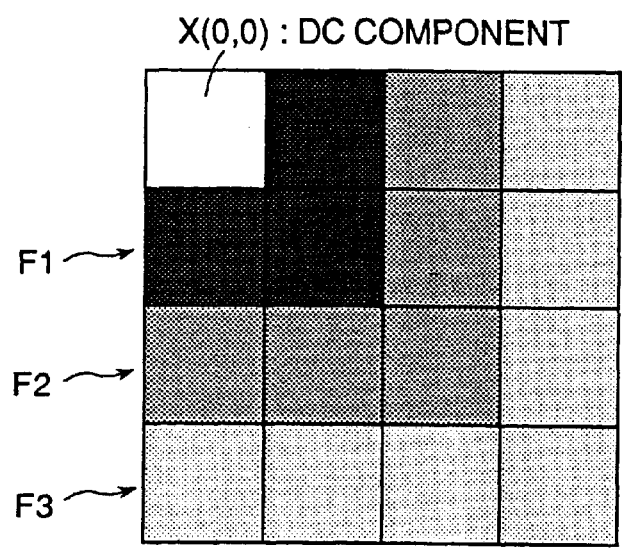
FIGS. 4A and 4B are illustrative of a matrix of frequency transformation coefficients after frequency-conversion processing by the method of FIG. 1.
FIG. 5 is illustrative of divided frequency areas in the matrix of frequency-transformation coefficients.

FIG. 1 is a flowchart depicting a procedure of processing image data by an image-data interpolation processing methods according to the first embodiment of the present invention. This processing method is to execute the sequential steps of extracting a partial image (STEP 1), converting the partial image into frequency data (STEP 2), calculating coefficients (STEP 3), discriminating a image (STEP 4), selecting a filter (STEP 4), interpolating image data (STEP 6) and repeat the sequence until all partial images are processed (STEP 7).

In the partial image extracting step (STEP 1), data of an objective partial image (area) is read from an original multigradational image inputted through a scanner or a digital camera or from multi-gradation original image data already inputted and stored in a storage unit such as a hard disc and a memory. The read-out data is stored in a specified memory.

The frequency conversion step (STEP 2) converts the partial image data read by the partial image extracting step (STEP 1) into frequency domains by using a frequency transformation matrix (e.g., DCT—discrete cosine transformation) whose size is the same as the partial image data and, then, temporarily stores the transformed values as coefficents of the frequency transformation matrix in a memory. In the coefficient calculating step (STEP 3), the frequency transformation matrix stored in the memory is divided into, for example, three frequency domains and a mean of absolute values of coefficients for each area is calculated. The mean values of respective areas are temporarily stored in a memory.

The image discriminating step (STEP 4) discriminates the presence or absence of an edge-portion in the partial image by substituting a corresponding mean coefficient value (stored in the memory) into a conditional equation (described later). The filter selecting step (STEP 5) selects either a bilinear interpolation filter or a cubic-convolution interpolation filter depending on whether the partial image contains or does not contains an edge portion (i.e., according to the discriminating result). The image-data interpolating step (STEP 6) executes interpolation of the partial image data by using the selected filter.

A practical example of interpolating an image data is described as follows:

A partial image composed of 4 by 4 pixels having 256 gradations is converted into frequency areas by two-dimensional discrete cosine transform (DCT) whose base length is 4. The DCT coefficients after frequency conversion are divided into three frequency areas, then interpolation is conducted to obtain a two-times higher resolution of the partial image by using a filter for bilinear interpolation or cubic convolution interpolation according to the conditional equation with mean values of the coefficients for respective frequency areas.

1-1 Image-Extraction Processing;

The image extraction processing is to read a partial image of 4 by 4 pixels from previously inputted data of an original image. FIG. 2A shows an example of density data of pixels composing the readout partial (non-edge) image that does not contain an edge portion while FIG. 2B shows an example of density data of pixels composing a partial (edge) image that contains an edge portion.

1-2 Frequency Conversion Processing;

The frequency conversion processing is to execute frequency conversion of a partial image of 4 by 4 pixels, e.g., a non-edge image as shown in FIG. 2A or an edge image as shown in FIG. 2B by two-dimensional discrete-cosine transformation (DCT) whose base length is 4. The two-dimensional DCT is expressed as follows:

$$X(u, v) = \sum_{m=0}^{N-1}\sum_{n=0}^{N-1} X(m, n) a_{uv}(m, n) \tag{1}$$

In the equation, $$a_{uv}(m, u) = a(u, m) a(v, n) \tag{2}$$
$$= (2/N) C(u) C(v) \cos\{(2m+1)u\pi/2N\} \cos\{(2n+1)v\pi/2N\}$$

where, X(m, n) is image data, $a_{uv}$(m, n) is a base of the two-dimensional DCT, N is a length of the base and X (u, v) is a DCT coefficient. C(u) and C(v) are constant values to be determined according to the following equation (3) by substituting u or v for p therein.

$$C(p) = 1/\sqrt{2} \ (p=0), \ C(p) = 1 \ (p \neq 0) \tag{3}$$

Concerning the expression X(u, v), the coefficient X(0, 0) is called "DC coefficient" and the remaining is called "AC coefficient". (see FIG. 5.)

The present invention provides the execution of two-dimensional DCT having a base length N=4, to which high-speed operational algorithms shown in equations (4) and (5) can be applied.

$$X(u, v) = (1/2) C(v) \sum_{n=0}^{3} X'(u, n) \cos\{(2n+1)v\pi/8\} \tag{4}$$
$$(u, v = 0, 1, 2, 3)$$

$$X'(u, n) = C(v) \sum_{m=0}^{3} X(m, n) \cos\{(2m+1)u\pi/8\} \tag{5}$$
$$(u, n = 0, 1, 2, 3)$$

To further increase the operational speed, values of "cos { }" in Equations (4) and (5) are previously determined and stored in the state shown in FIG. 3. The values shown in FIG. 3 are expressed with a fixed decimal point shifted to the left by 12 bits, instead of floating decimals, for high-speed operations.

As shown in FIGS. 4A and 4B, DCT coefficients are determined by high-speed calculations according to Equations (4) and (5) using the values shown in FIG. 3.

1-3 Coefficient Calculation Processing;

This processing is to divide AC components in a 4 by 4 matrix of the DCT coefficients (FIG. 4A or 4B) into three frequency areas F1 to F3 and calculate mean coefficient values f1 to f3 for the respective frequency areas according to Equations (6) to (8) respectively.

$$f1 = \{|X(1,0)| + |X(0,1)| + |X(1,1)|\}/3 \tag{6}$$

$$f2 = \{|X(2,0)| + |X(2,1)| + |X(0,2)| + |X(1,2)| + |X(2,2)|\}/5 \tag{7}$$

$$f3 = \{|X(3,0)| + |X(3,1)| + |X(3,2)| + |X(0,3)| + |X(1,3)| + X(2,3) + X(3,3)\}/7 \tag{8}$$

1-4 Image Discrimination Processing;

This processing is to discriminate the partial image containing an edge portion according to conditional equations (9) and (10) by substituting the mean coefficient values f1 to f3 obtained by Equations (6) to (8) into the Equations (9) and (10).

$$f1 > 30 \text{ and } f2 < 30 \text{ and } f3 < 5 \tag{9}$$

$$f1 < 8 \text{ and } f2 < 5 \text{ and } f3 < 5 \tag{10}$$

The above equations (9) and (10) are obtained by analysis of mean coefficient values obtained through experimental frequency-conversion of various kinds of image data using two-dimensional DCT. Equation (9) represents that DCT coefficients of a partial image concentrate in a low-frequency area whereas Equation (10) represents that DCT coefficients of a partial image concentrate in DC components and AC component values are generally small. The partial image can be judged to be of a small change in density with no edge-portion included therein if it satisfies either one of the Equations (9) and (10).

Since the example shown in FIG. 4A satisfies the conditional equation (9), the partial image shown in FIG. 2A is discriminated as a non-edge image that does not contain an edge-like component. On the contrary, the example shown in FIG. 4B cannot satisfy both conditional equations (9) and (10) and the partial image shown in FIG. 2B is therefore judged as an edge image that contains an edge-like component.

1-5 Filter Selection Processing;

This processing is to select a filter of bilinear interpolation for a non-edge image and a filter of cubic-convolution interpolation for an edge-image.

1-6 Image Data Interpolation Processing;

This processing is to determine insufficient image data to be compensated for increasing the resolution of the partial image by a factor of two by the selected method of interpolation.

It is now assumed that a partial image area is discriminated to an image not containing an edge-portion and the bilinear interpolation is selected. In this case, an interpolating pixel P(u, v) is determined according to the following equations (11) and (12), using original pixel data (P(i, j), P(i+1, J), P(i, j+1) and P(i+1, j+1). (See FIG. 6A.)

$$P(u,v) = \{(i+1)-u\}\{(j+1)-v\}P_{ij} + \{(i+1)-u\}(v-j)P_{ij+1} + (u-i)\{(v+1)-v\}P_{i+1j} + (u-i)(v-j)P_{i+1j+1} \tag{11}$$

$$i[u], j=[v] \tag{12}$$

In the above equations, u and v represent coordinates of an interpolative pixel and P denotes a density value of a pixel. The partial image of FIG. 2A is converted into a high-resolution image shown in FIG. 7A.

An partial image is discriminated as an edge-containing image to be processed by cubic-convolution interpolation. In this case, an interpolative pixel P(u, v) is determined according to the following equations (13) to (15) with 16 pieces of original pixel data of P(1, 1) to P(4, 4). (See FIG. 6B.)

$$P(u, v) = [f(y1) f(y2) f(y3) f(y4)] \begin{bmatrix} P_{11} & P_{12} & P_{13} & P_{14} \\ P_{21} & P_{22} & P_{23} & P_{24} \\ P_{31} & P_{32} & P_{33} & P_{34} \\ P_{41} & P_{42} & P_{43} & P_{44} \end{bmatrix} \begin{bmatrix} f(X1) \\ f(X2) \\ f(X3) \\ f(x4) \end{bmatrix} \tag{13}$$

$$f(t) = (\sin \pi t)/(\pi t) \tag{14}$$

$$X_1 = 1 + (u - [u]) \ Y_1 = 1 + (v - [v])$$

$$X_2=(u-[u])\ Y_2=(v-[v])$$

$$X_3=1-(u-[u])\ Y_3=1-(v-[v])$$

$$X_4=2-(u-[u])\ Y_4=2-(v-[v]) \tag{15}$$

The partial image of FIG. 2B is converted into a high-resolution image shown in FIG. 7B.

In FIGS. 7A and 7B, the original image pixels are shown as hatched and pixels added by interpolation are shown without being hatched.

Figure 8:
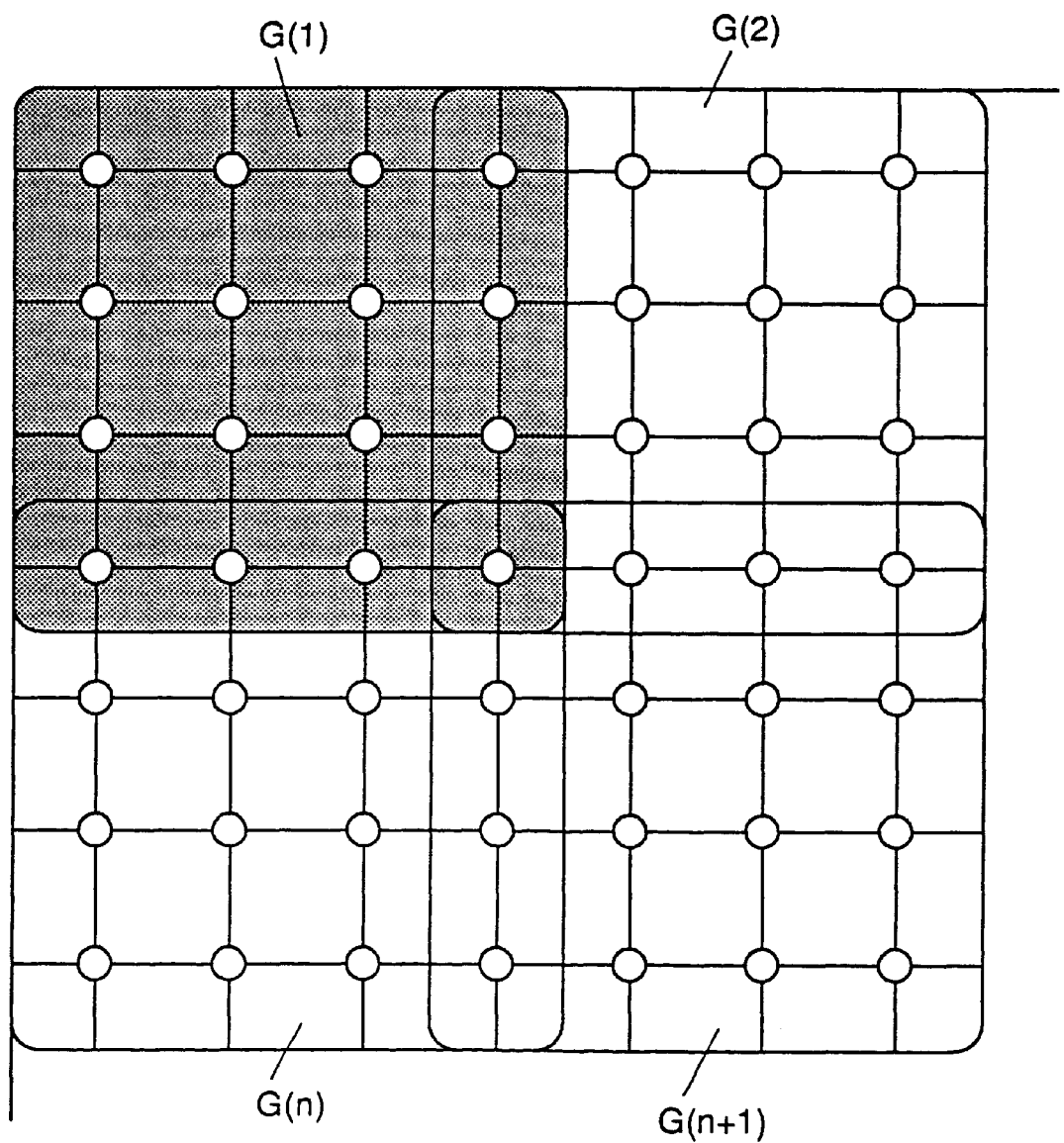
FIG. 8 is illustrative of a state of extracting a partial image data according to the method of FIG. 1.

The above-described processing operations 1-1 to 1-6 are repeated until an entire image is processed. In repeatedly reading a series of partial images each of 4 by 4 pixels from an original image, the scanning area is shifted every time by three pixels in the main- or sub-scanning direction as shown in FIG. 8. For example, a partial image G(1) of FIG. 8 is first scanned and interpolated, then a partial image G(2) shifted by three pixels in the main scanning direction is scanned and interpolated. The similar operations are repeated until the last partial image in the main scanning direction is read and interpolated. Next, the interpolation is executed first on a partial image G shifted from a partial image G(1) by three pixels in the main scanning direction and then on a partial image G(n+1) shifted from the image G(n) by three pixels in sub scanning direction. Such scans obtain a series of partial images overlapped each by one pixel with neighboring images. This assures the continuity of densities between the partial images that can be interpolated with no irregularities in density of the entire image.

According to the image-data interpolating method of the present invention, it is possible to convert data of each partial image extracted from an original image into frequencies, divide a frequency-transformed coefficient matrix having the same size as that of the partial image into plural frequency areas, discriminate the presence or absence of an edge portion in the partial image by examining that the mean coefficient values in respective frequency areas meet the conditional equations, select either of the interpolating methods depending upon the result of discrimination and adaptively interpolate the partial image.

Consequently, an image containing different kinds of components-areas (e.g., a character area and a photographic area) can be easily interpolated by selectively applying suitable methods independently to the respective areas. This can obtain an entire image that satisfies both requirements for resolution of the character image area and the smooth change in density of the photographic image area.

The above-described embodiment uses the DCT method for transforming partial image data into frequency areas, but it may also use Fourier transformation or Wavelet transformation instead of DCT. In the embodiment, the DCT is applied with its base length N=4 but may be also applied with its base length N=8 or other value. Furthermore, interpolation methods are not limited to the cubic convolution and bilinear methods.

Figure 9:
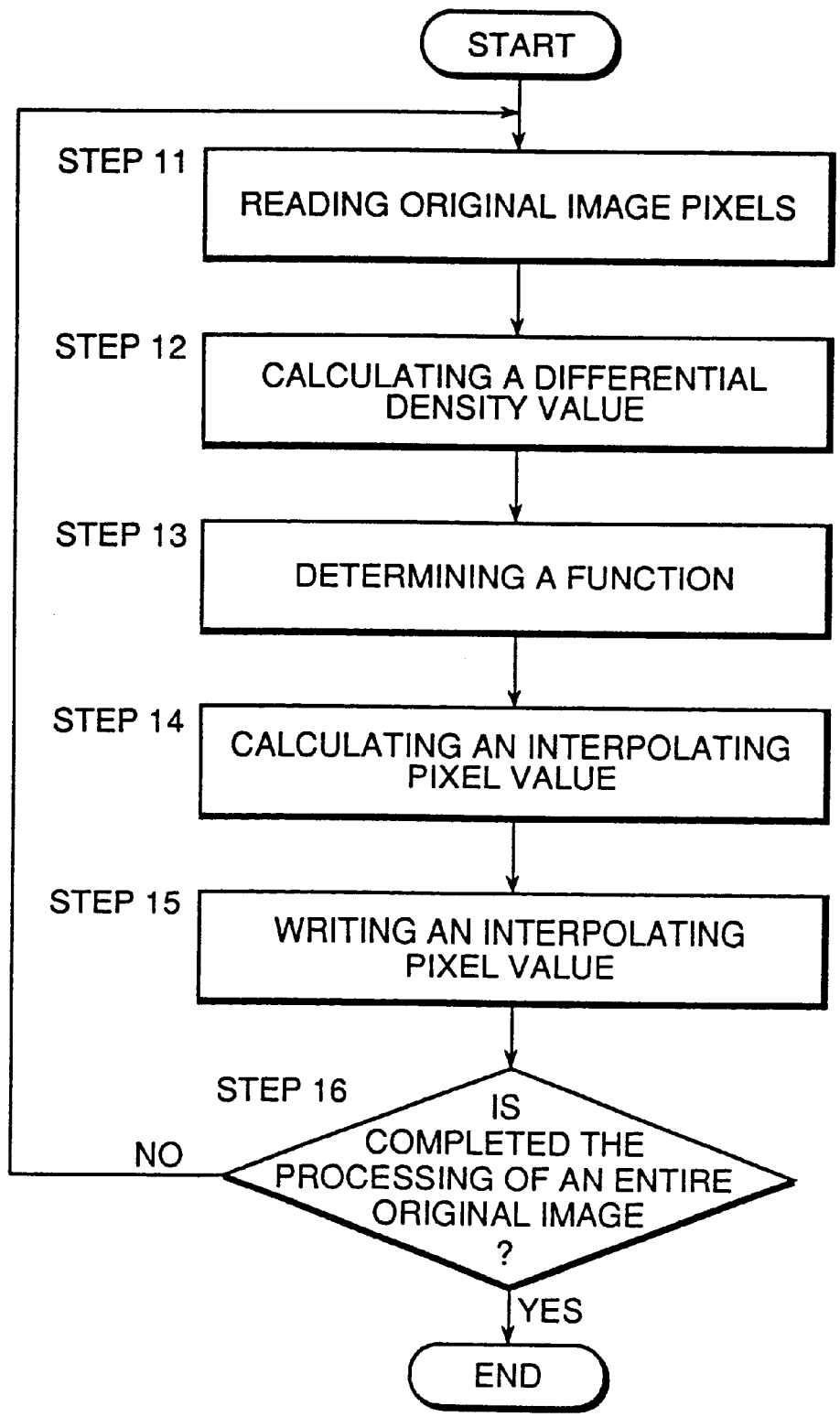
FIG. 9 is a flow chart depicting a procedure of interpolating image data by an image-data interpolation processing method according to the second embodiment of the present invention.
Figure 10:
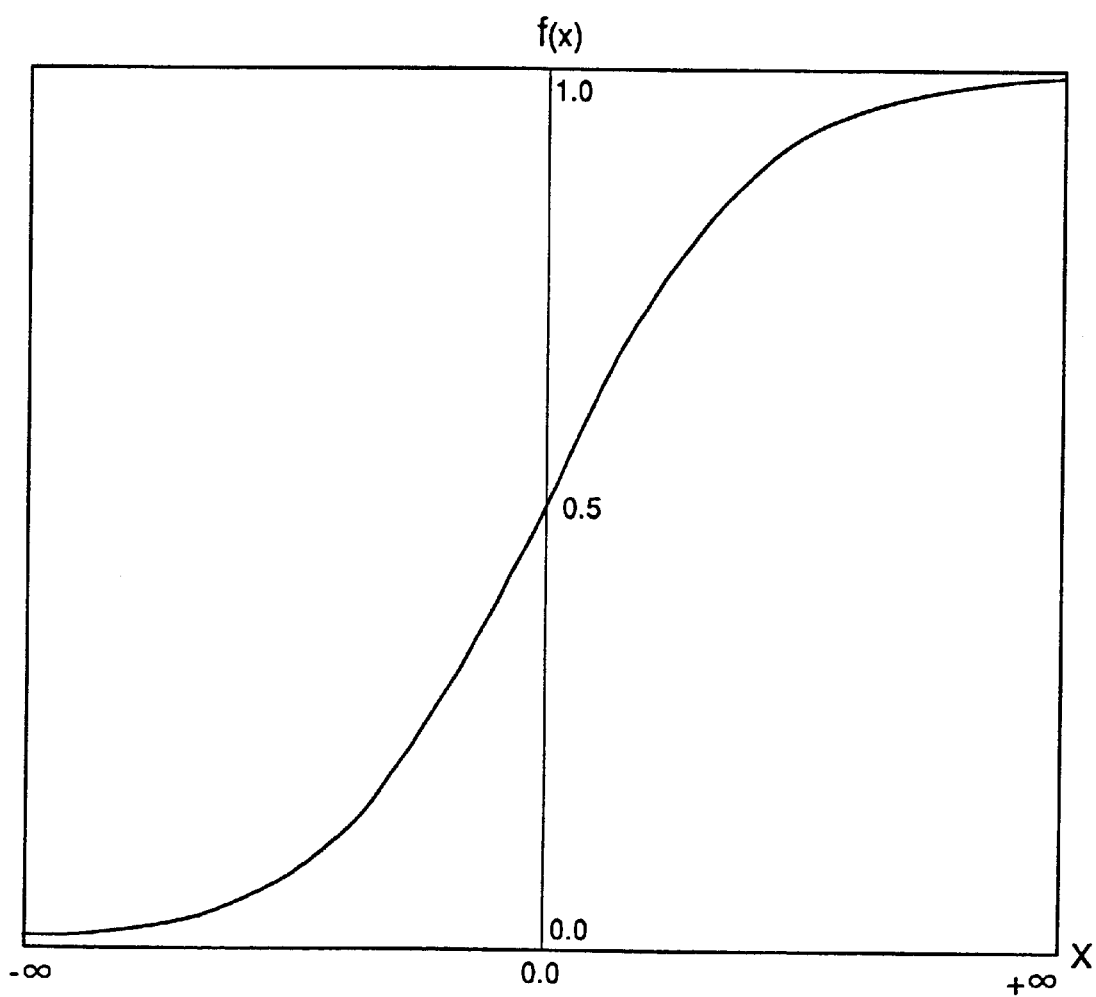
FIG. 10 is illustrative of an exemplified monotone increasing function used for image-data interpolation processing method of FIG. 9.
Figure 11A:
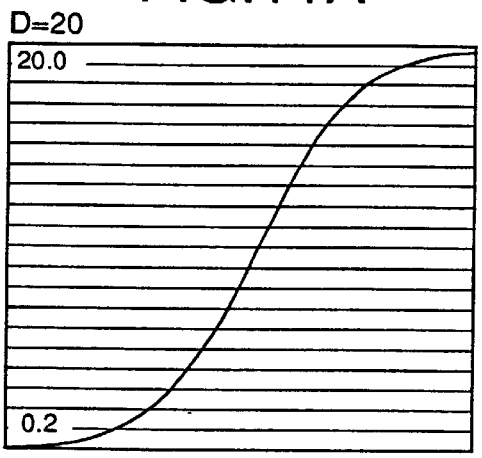
FIGS. 11A, 11B, 11C, 11D, 11E and 11F are illustrative of a changing state of an inclination and an input value according to differential density of the monotone increasing function.
Figure 11D:
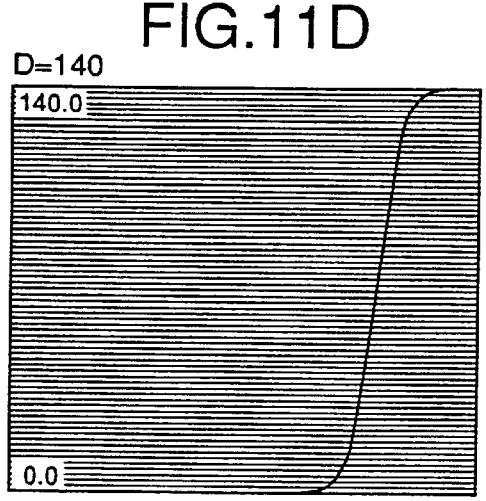
Figure 11B:
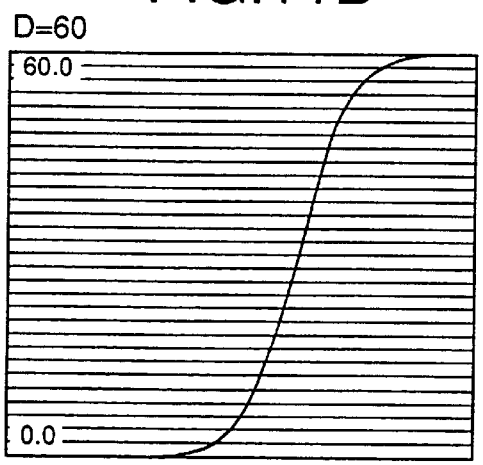
Figure 11E:
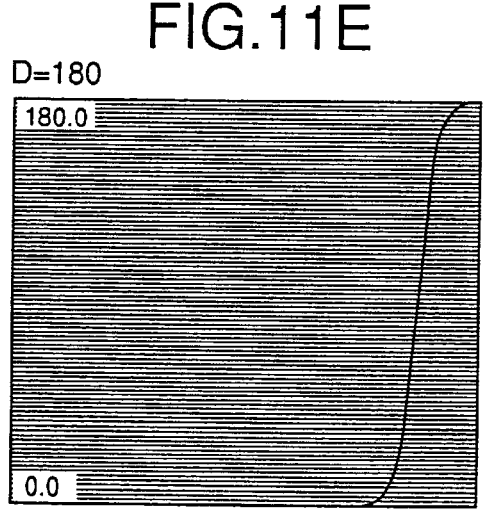
Figure 11C:
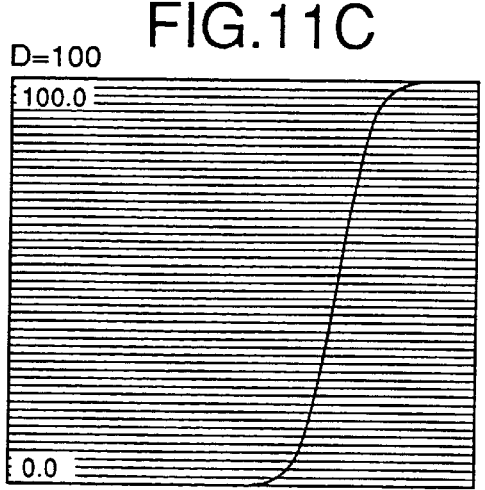
Figure 11F:
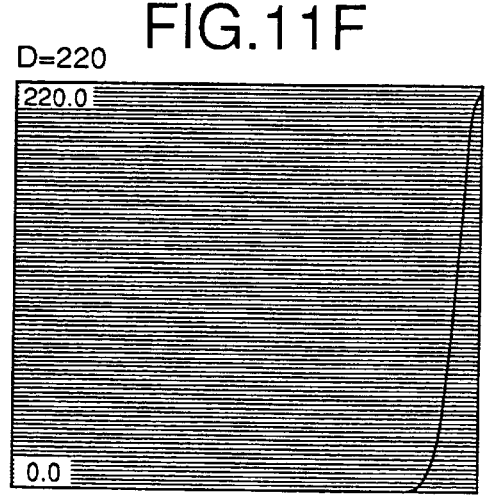

FIG. 9 is a flowchart depicting a procedure of processing image data by an image-data interpolation processing method according to the second embodiment of the present invention. This processing method is to execute the steps of reading data of pixels composing an original image (STEP 11), calculating a differential density value (STEP 12), determining a function (STEP 13), calculating values of interpolating pixels (STEP 14) and writing the interpolating pixel values (STEP 15) and repeat the sequence until all partial images are processed (STEP 16).

In the pixel reading step (STEP 11), data of pixels neighboring with an objective pixel is read from an original multigradational image inputted through a scanner or a digital camera or from multi-gradation original image data already inputted and stored in a storage unit such as a hard disc and a memory. The read data is stored in a specified memory.

The differential density value calculating step (STEP 12) determines difference between densities of two pixels existing one at both sides of the objective pixel.

The function determining step (STEP 13) determines a gradient and a segment or an input value of a monotone increasing function for calculating the density value of an interpolating pixel (interpolating pixel value) according to the difference between densities of the pixels existing one at both sides of the interpolating pixel.

The interpolating pixel value calculating step (STEP 14) determines an interpolating pixel value according to the differential density value of two pixels coexisting one at both sides of the objective pixel and the monotone increasing function with the determined gradient and segment or input value.

The interpolating pixel writing step (STEP 15) writes the operational results with the calculated interpolating pixel values in a memory.

A practical example of determining an interpolating pixel value by the above interpolation processing method is conducted on condition that a pixel is interpolated at an interpolating position k=0.5 in the main scanning direction (x-axis direction) to obtain an image of two-times higher resolution or enlarged by a factor of 2 by 2 of the original image of 256 gradation levels (M=256):

2-1 When a Difference between Densities of Two Pixels Existing One on Both Sides of the Objective (Interpolative) Pixel is Small;

It is supposed that a neighboring pixel existing on the left side of the objective pixel has a pixel value P(x1, y1)=200, a neighboring pixel existing on the right side of the objective pixel has a pixel value P(x2, y1)=190 and the objective pixel has a pixel value P(x, y). The interpolation will be done at the interpolating position k=0.5 in the main scanning (x-axis) direction, hence y=y1 and x=x1+k=x2−(1−k). The density difference D between two neighboring pixels is calculated as D=190−200=−10.

The pixel value P(x, y) of the objective pixel is calculated with the differential density value D according to the following Equation (16).

$$P(x, y) = P(x1, y1) + \frac{D}{1 + \exp(-(5 + (64/M)D)(k - (1/2 + (1/2M)D)))} \tag{16}$$

Figure 12:
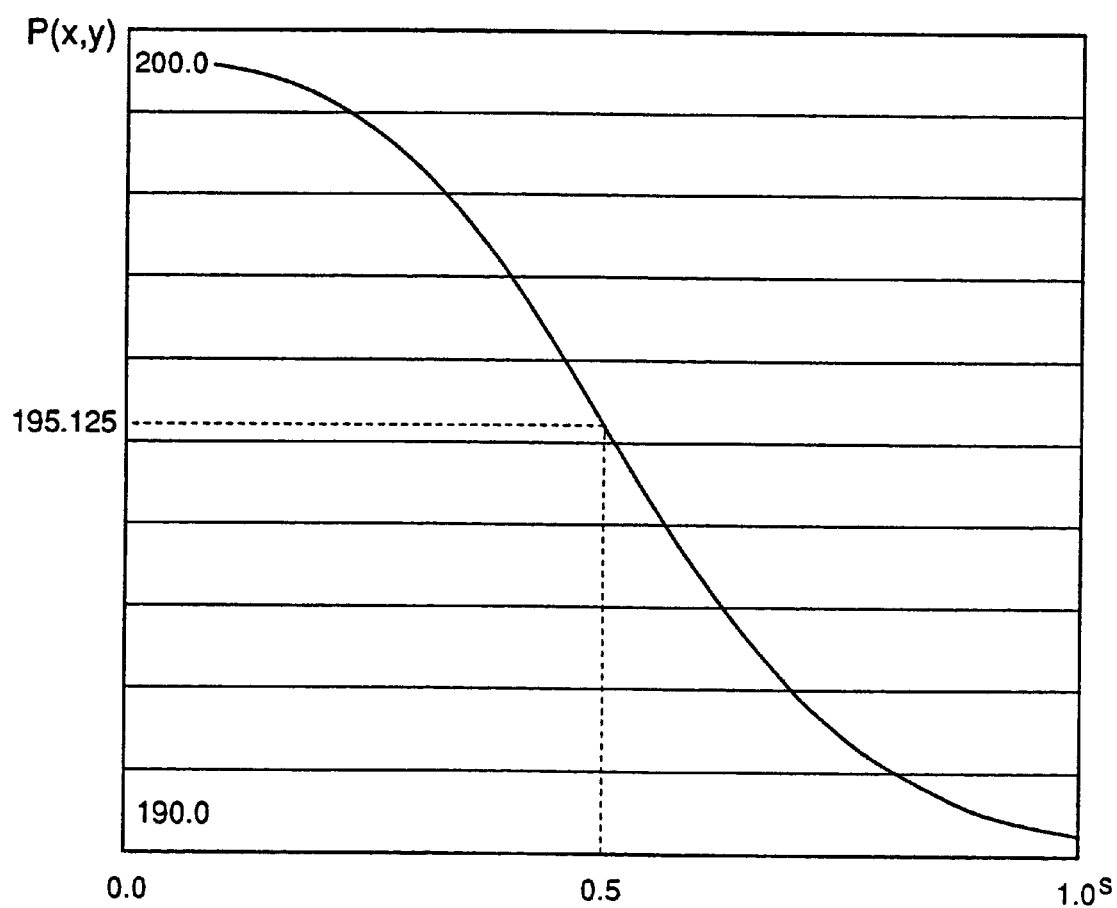
FIG. 12 is illustrative of a monotone increasing function used for interpolating image data when a difference between densities of two neighboring pixels at both sides of an interpolating pixel is small.

Equation (16) is obtained based on a sigmoid function that is a nonlinear monotone increasing function shown in FIG. 12. This sigmoid function is expressed as Equation (17) and it has an input value within $-\infty \leq x \leq \infty$ and an output value within $0 < f(x) < 1$.

$$f(x) = \frac{1}{1 + \exp(-x)} \tag{17}$$

Equation (16) allows changing the input value and the gradient when an output value of Equation (17) is equal to 0.5.

FIGS. 11A to 11F show how the input value and the gradient with a sigmoid function output value of 0.5 vary depending on a differential density value D. As is apparent from FIGS. 11A to 11F, an interpolative pixel-value similar to that obtained by bilinear interpolation may be obtained as far as the differential density value D is small. The gradient of the sigmoid function increases more sharply and an entire curve is shifted to the right as the differential density value D increases. This may obtain an interpolative pixel-value that can maintain substantially the same differential density of the original image without dimming the edge image portion.

P(x, y)=P(x1, y1) when the differential density value D is equal to zero.

When the differential density value D=−10 in this example is substituted into Equation (16) the sigmoid function takes the state shown in FIG. 12. An interpolating pixel value P(x, y) being nearly equal to 195 is obtained at an input value of 0.5. The sigmoid function shown in FIG. 12 is monotonously decreasing because the left-side neighboring pixel P(x1, y1) has a density value being larger than that of the right-side neighboring pixel P(x2, y1).

Figure 13:
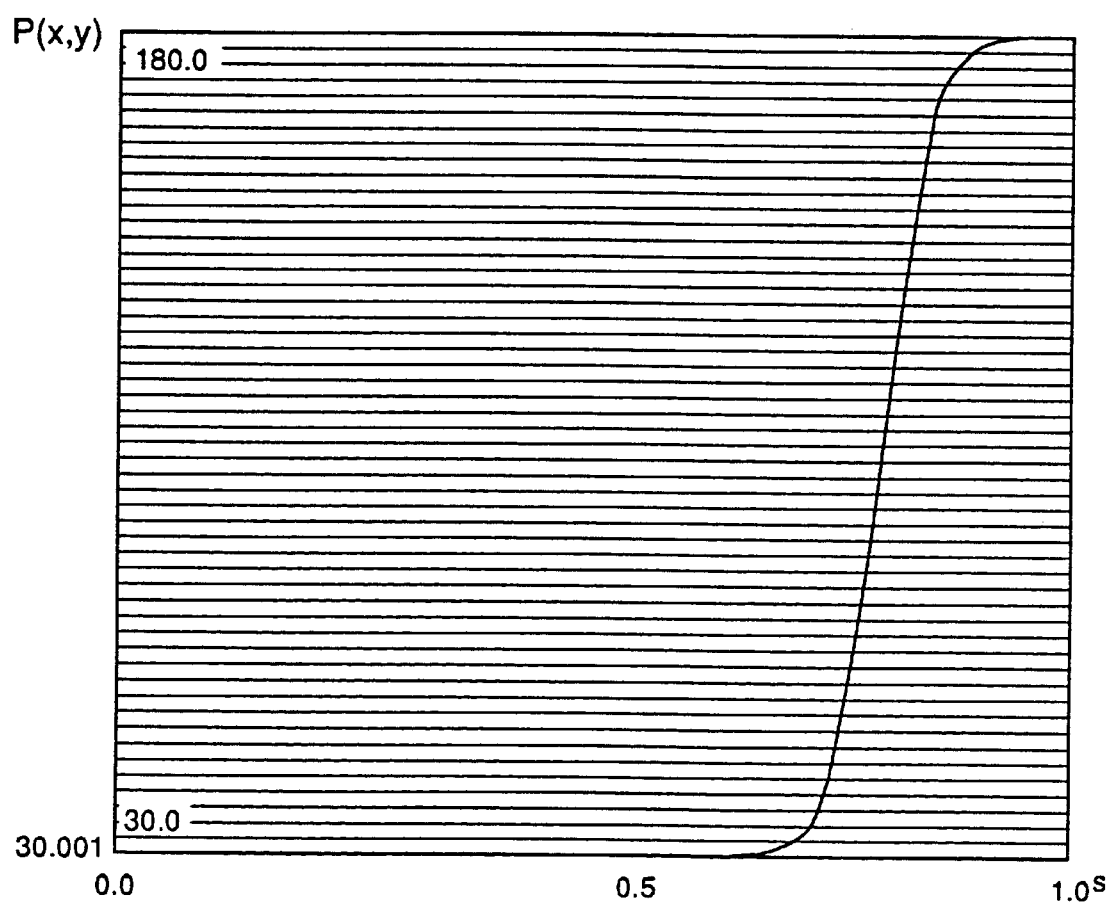
FIG. 13 is illustrative of a monotone increasing function used for interpolating image data when a difference between densities of two neighboring pixels at both sides of an interpolating pixel is large.

2-2 When a Difference between Densities of Two Pixels Existing One on Both Sides of the Objective (Interpolative) Pixel is Large;

It is supposed that a neighboring pixel existing on the left side of the objective pixel has a pixel value P(x1, y1)=30, a neighboring pixel existing on the right side of the objective pixel has a pixel value P(x2, y1l)=180 and the objective pixel has a pixel value P(x, y). In this case, the density difference D between the left and right neighbors is equal to 150 that is substituted into Equation (16) to obtain a sigmoid function shown in FIG. 13. The objective pixel value P(x, y) being nearly equal to 30 is obtained when an input value is 0.5.

According to the above-described image-data interpolation processing method, an original image area with a small density change can be interpolated with interpolating pixel values being near to those of neighboring pixels to represent smoothly changing density of the image while an original image area with a large density change can be interpolated with interpolating pixel values at which the differential density of the neighbors is held to reliably maintain the edge portion contained in the original image.

The above-mentioned embodiment has been described for interpolating a pixel at an interpolation position in a main scanning direction, but it may also interpolate a pixel in a sub-scanning direction. In this case, an upper neighboring pixel has a pixel value P(x1, y1) and a lower neighboring pixel has a pixel value P(x1, y2).

As is apparent from the foregoing, the present invention offers the following advantages:

According to the present invention, it is possible to exactly discriminate with ease whether a partial image contains an edge-portion according to mean values of coefficients for respective frequency domain into which the partial image data extracted from an original image has been converted and adaptively interpolate the partial image containing the edge portion to maintain its edge feature and the partial image with no edge-portion to maintain the smooth density change.

According to the present invention, it is possible to easily convert the image data composing the partial image extracted from an original image into frequency data by discrete cosine transformation (DCT) followed by dividing the DCT coefficients into plural frequency domains according to coordinates matched in the matrix and to exactly discriminate with ease the presence or absence of am edge-portion in the partial image according to mean values of coefficients obtained for the respective frequency domains with no need of consideration of the edge direction.

According to the present invention, it is possible to calculate mean values of frequency transformation coefficients for each of the frequency domains by using absolute values of the coefficients, whereby a sum of the frequency transformation coefficients for respective frequency domains can be calculated without canceling the features of respective pixels, thus allowing the interpolated image to maintain the features of the original image.

According to the present invention, it is possible to execute adaptive processing of a partial image of an original depending on the presence or absence of an edge-like component therein in such a manner that the partial image containing an edge component is processed by cubic-convolution interpolation for maintaining the edge image feature or the partial image with no edge-portion is processed by bilinear interpolation for maintaining smooth change in density of the image.

According to the present invention, it is possible to determine the density of an interpolative pixel by using a monotone increasing function allowing replacing an gradient and an input value depending on a density difference between two neighbors existing one at each side of the interpolating pixel, whereby any partial image can be adaptively processed easier for a shorter time, eliminating the need of discriminating whether the image contains an edge-like component.

According to the present invention, it is possible to interpolate an image data by presetting an interpolating pixel value at a half of a differential density value determined between two neighbors existing one at each side of the interpolative pixel when the density difference is relatively small or by presetting an interpolating pixel value at a smaller one of the neighbors when the density difference is relatively large, whereby a partial image with no edge-portion (with a small differential density) can be processed similarly as processed by bilinear interpolation for maintaining the smooth change in density of the image or a partial image containing an edge-portion (with a large differential density) can be processed similarly as processed by cubic-convolution interpolation for maintaining the feature of the edge image.

What is claimed is:

1. An image-data interpolation processing method comprising:

extracting a partial objective image from an input image;

converting the extracted partial objective image into frequency data;

dividing a frequency-conversion coefficient matrix equivalent in size to the frequency-converted partial objective image into plural frequency domains;

calculating mean values of coefficients of the respective frequency domains;

discriminating whether the partial objective image includes an edge-portion according to the mean values of the respective frequency domains determined by the calculating step;

interpolating the partial objective image by selectively applying one of the predetermined interpolation processes according to the result by the discriminating step; and wherein the converting step uses a discrete cosine transformation and the calculating step includes processing for dividing an alternating current component of the coefficient of the discrete cosine transformation at matched horizontal and vertical positions in a matrix in a direction from a low-frequency component to a high-frequency component.

2. An image-data interpolation processing method as defined in claim 1, wherein the calculating step includes processing for determining an absolute value of the frequency-conversion coefficient obtained by the converting step.

3. An image-data interpolation processing method as defined in claim 1, the predetermined interpolation processes are bilinear interpolation and cubic convolution interpolation.

4. The method claim 1, wherein said converting step comprises converting the extracted partial objective image into frequency data using discrete cosine transform (DCT).

5. The method of claim 4, wherein said dividing step comprises dividing DCT coefficients into the plural frequency domains.

* * * * *